United States Patent [19]

Asano et al.

[11] Patent Number: 4,672,566
[45] Date of Patent: Jun. 9, 1987

[54] DEVICE FOR MEASURING VARIABLE WITH AUTOMATIC COMPENSATION FOR OFFSET

[75] Inventors: Masaharu Asano, Fujisawa; Yoshihisa Kawamura; Koyo Nakamura, both of Yokosuka, all of Japan

[73] Assignee: Nissan Motor Company, Limited, Japan

[21] Appl. No.: 442,291

[22] Filed: Nov. 17, 1982

[30] Foreign Application Priority Data

Dec. 1, 1981 [JP] Japan .......................... 56-177777[U]
Dec. 2, 1981 [JP] Japan .............................. 56-192785

[51] Int. Cl.$^4$ .......................... G01K 19/00; G06F 7/76
[52] U.S. Cl. .................................. 364/571; 73/118.2; 324/73 AT; 364/431.06; 364/550; 374/144
[58] Field of Search ...................... 73/1 R, 117.2, 118; 364/431.06, 550, 570, 571, 579; 374/141, 144, 172, 173; 324/73 AT, 73 R; 340/501, 516; 371/25

[56] References Cited

U.S. PATENT DOCUMENTS

| | | | |
|---|---|---|---|
| 3,101,617 | 8/1963 | Brinson | 374/113 |
| 3,472,068 | 10/1969 | List et al. | 374/144 |
| 3,618,386 | 11/1971 | Black | 374/144 |
| 3,683,683 | 8/1972 | Demidov et al. | 374/145 |
| 3,710,350 | 1/1973 | Yoshitake et al. | 371/25 X |
| 3,719,071 | 3/1973 | Hohenberg | 374/144 |
| 3,882,451 | 5/1975 | Fujishiro et al. | 374/144 |
| 3,906,796 | 9/1975 | Dumbeck | 374/173 |
| 3,939,711 | 2/1976 | Hanaoka | 374/144 |
| 3,990,308 | 11/1976 | McCormick et al. | 374/144 X |
| 4,060,065 | 11/1977 | Hata et al. | 123/571 |
| 4,096,575 | 6/1975 | Itoh | 364/571 |
| 4,102,199 | 7/1978 | Tsipouras | 374/172 |
| 4,119,070 | 10/1978 | Asano | 371/25 X |
| 4,169,243 | 9/1979 | Payne et al. | 374/172 |
| 4,211,113 | 7/1980 | Harrison | 374/179 |
| 4,224,466 | 9/1980 | Bush et al. | 364/579 X |
| 4,254,469 | 3/1981 | Whitely | 364/571 |
| 4,293,916 | 10/1981 | Del Re et al. | 364/571 |
| 4,315,243 | 2/1982 | Calvert, Sr. | 374/144 X |
| 4,364,027 | 12/1982 | Murooka | 364/571 X |
| 4,423,487 | 12/1983 | Buckenham et al. | 364/571 |
| 4,423,967 | 1/1984 | Mouton | 374/179 |

FOREIGN PATENT DOCUMENTS

| | | |
|---|---|---|
| 970593 | 7/1975 | Canada . |
| 1135187 | 8/1962 | Fed. Rep. of Germany . |
| 2822893 | 12/1978 | Fed. Rep. of Germany . |
| 2744890 | 4/1979 | Fed. Rep. of Germany . |
| 1908216 | 9/1979 | Fed. Rep. of Germany . |
| 3039092 | 5/1982 | Fed. Rep. of Germany . |

OTHER PUBLICATIONS

Radio Shack Dictionary of Electronics; R. F. Graf; 1975; p. 392.
"A Temperature Compensatory Method for Log Amplifier", K. Kawashima, pp. 25-32; IEEE Trans. Nucl. SCI (USA) vol. AS-17 (#5).
Motorola Technical Disclosure Bulletin, vol. 1, No. 1, Aug. 1980 "Piecewise Linear Analog Temperature Compensation Scheme Utilizing a Highly Interactive Electrically Programmable Read-Only Memory" by Bob Steel and Jim Irwin.

Primary Examiner—Errol A. Krass
Assistant Examiner—Kevin J. Teska
Attorney, Agent, or Firm—Lane and Aitken

[57] ABSTRACT

A measurement device for measuring a physical property such as temperature difference, displacement, pressure, fluid flow rate, etc. comprises: (a) an amplifying means which receives and amplifies a voltage signal corresponding to a detected physical property; (b) a reference voltage generator which generates and applies a reference voltage to the amplifying means at a predetermined time; (c) a memory which stores the output voltage signal from the amplifying means when the reference voltage generator applies the reference voltage to the amplifying means; and (d) a calculating means which outputs at least one command signal to the reference voltage generator to apply the reference voltage to the amplifying means and to the memory to store the output voltage of the amplifying means into a specified memory location thereof at the predetermined time and calculates the value of the desired physical property from the current output voltage of the amplifying means with reference to the stored voltage value in the memory, whereby an accurate physical property measurement can be made by compensating for individual differences and deterioration of the characteristics of the measurement device.

9 Claims, 8 Drawing Figures

DEVICE FOR MEASURING VARIABLE WITH AUTOMATIC COMPENSATION FOR OFFSET

BACKGROUND OF THE INVENTION

1. Field of the Invention

The present invention relates generally to a measurement device for measuring a variable, e.g., temperature difference, with an automatic offset error compensation, and more specifically to a measurement device which automatically compensates for discrepancies in operating characteristics due to aging and/or random effects of dispersed circuit parameters and variations during manufacture in an amplifying section which amplifies a detector voltage signal according to changes in the variable to be measured.

2. Description of the Prior Art

In the case where a variable such as displacement, pressure, flow rate, and temperature, etc., (hereinafter referred simply to as a parameter) is detected in the form of a voltage, the detected voltage is amplified by the measurement device and the amplified voltage is processed by a subsequent calculating circuit so as to obtain a measurement value.

An automotive vehicle engine requires a measurement of the temperature difference ($\Delta T = T_2 - T_1$) between the temperature ($T_1$) of intake air from outside of the engine and the temperature ($T_2$) of the intake air intermixed with exhaust gas.

The temperature difference described above can be measured by means of a thermocouple utilizing the Seebeck effect.

If two junctions of two different kinds of metals are disposed at higher and lower temperature sections, respectively, a thermoelectromotive force is generated according to the temperature difference $\Delta T$ and consequently a voltage ($V_2 - V_1$) is produced according to the detected temperature difference and is outputted to an amplifying circuit. The amplified voltage is processed by a calculating circuit to convert a desired temperature difference, as is shown in FIG. 1.

The amplifying circuit described above comprises the following items, as shown in FIG. 2:

(a) a first operational amplifier having a noninverting input terminal connected to one terminal of the thermocouple to receive a lower voltage $V_1$ indicative of the thermo-electromotive force generated by the thermocouple on the lower temperature side and connected to a constant voltage supply $V_0$ via first resistor $R_0$, an inverting input terminal connected to the constant voltage supply $V_0$ via a second resistor $R_1$, and an output terminal thereof connected to the inverting input terminal via a third resistor $R_2$; (b) a second operational amplifier having a noninverting input terminal connected to the other terminal of the thermocouple to receive a higher voltage $V_2$ indicative of the thermo-electromotive force generated by the thermocouple on the higher temperature side, an inverting input terminal connected to the output terminal of the first operational amplifier via a fourth resistor $R_3$, and an output terminal thereof connected to the inverting input terminal of the second operational amplifier via a fifth resistor $R_4$; and (c) a third operational amplifier having a noninverting input terminal connected to the output terminal of the second operational amplifier, an inverting input terminal connected to ground via a sixth resistor $R_5$, and an output terminal connected to its inverting input terminal via a seventh resistor $R_6$. In the processing circuit described above, if the ratio of the resistances of the resistors are expressed as $\alpha = (R1/R2) = (R4/R3)$, $\beta = (R6/R5)$, and $w_1$, $w_2$, and $w_3$ are respective offset voltages of the first, second, and third operational amplifiers, the output voltage $u_1$ of the first operational amplifier and output voltage $u_2$ of the second operational amplifier can be expressed, respectively, in the following equations:

$$u_1 = (1/\alpha)(V_1 - V_0 + w_1) + V_1 + w_1 \quad (1)$$
$$u_2 = \alpha(V_2 - u_1 + w_2) + V_2 + w_2 \quad (2)$$

in addition, the output voltage E of the processing circuit can be expressed by the equation:

$$E = (1+\beta)(u_2 + w_3) \quad (3)$$

From these three equations (1), (2), and (3), the output voltage E can be rewritten as:

$$E = (1+\alpha)(1+\beta)(V_2 - V_1) + (1+\beta)\{(-1+\alpha)(w_2 - w_1) + w_3 + V_0\} \quad (4)$$

, wherein $(1+\alpha)$ and $(1+\beta)$ are amplification factors of the associated operational amplifiers.

In the equation (4) expressed above, the first item on the right side of the equation indicates a pure amplified voltage corresponding to the thermoelectromotive force on the basis of the difference in temperature and the second item on the right side of the equation represents a voltage including the offset voltage of each of the operational amplifiers. It should be noted that because of irregularities in thermo-electromotive-force characteristics of each thermocouple, the first item inherently includes another offset voltage factor such that the difference between the higher and lower thermoelectromotive forces ($V_2 - V_1$) will probably not be zero when the ambient temperature is at 0° C., i.e., the temperatures at both junctions is 0° C.

Hoever, there are drawbacks in such a conventional measurement device. When many such measurement devices are massproduced, the circuit parameters of the resistors $R_0$ through $R_6$ and constant voltage $V_0$ all need to be adjusted to make the amplification factor $(1+\beta)(1+\alpha)$ and the offset voltage $(1+\beta)\{(1+\alpha)(w_2 - w_1) + w_3 + V_0\}$ of each amplifying circuit equal to those of other measurement devices. This adjustment requires a great amount of labor in manufacturing of the measurement devices. Furthermore, after the circuit parameters and offset voltage of each measurement device are adjusted, the characteristics of the thermocouple used in the measurement device may change due to heat when the thermocouple is soldered into the measurement device and the operating characteristics of the measurement device itself may change due to the effects of aging.

Therefore, errors may occur in the output voltage E of the amplifying circuit and measurement errors may occur in the output value of the calculating circuit of the measurement device.

SUMMARY OF THE INVENTION

With the above-described drawbacks in mind, it is an object of the present invention to provide a measurement device which automatically compensates for discrepancies between the characteristics of individual measurement devices and for deterioration of the characteristics of an element converting a measured variable into a voltage signal and of the measurement device itself, wherein in addition to the conventional amplifying and calculating circuits there are provided a reference voltage generator which generates and applies a reference voltage across the input terminals of the amplifying circuit in response to a command signal from the calculating circuit and a memory which stores the output voltage of the amplifying circuit when the reference voltage is applied across the input terminals of the amplifying circuit, whereby the calculating circuit receives the current output voltage of the amplifying circuit when a varable is measured and calculates the measured variable on the basis of the stored value within the memory to obtain an accurate value of the measured variable.

BRIEF DESCRIPTION OF THE DRAWINGS

A more complete understanding of the present invention may be obtained from the following detailed description taken in conjunction with the drawings in which like reference numerals designate corresponding elements and in which.

DETAILED DESCRIPTION OF THE PREFERRED EMBODIMENTS

Reference will be made to the drawings and first to FIG. 1 which shows a conventional measurement device applied to the measurement of a temperature difference.

Figure 1:
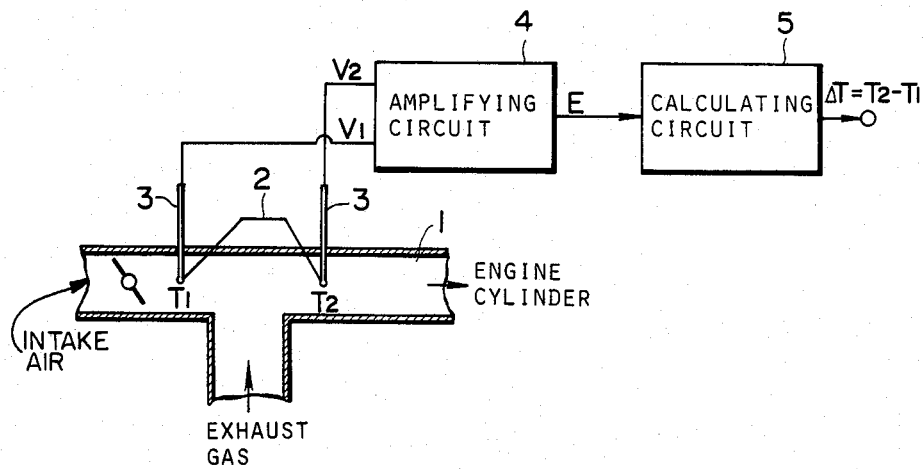
FIG. 1 is a simplified block diagram of a conventional measurement device applied to a temperature difference measurement.

In FIG. 1, numeral 1 denotes an intake air passage of an automotive vehicle engine, wherein intake air from outside is intermixed with part of the engine exhaust (exhaust gas recirculation) and the intermixed air is sent into the engine cylinders. To control exhaust gas recirculation, it is necessary to measure the difference ($\Delta T = T_2 - T_1$) between the lower temperature $T_1$ of the atmospheric intake air and the higher temperature $T_2$ of the air/exhaust mixture.

The temperature difference between the higher temperature section of the air intake passage and lower temperature section can be detected by utilizing the Seebeck effect.

If two different kinds of metals 2 and 3 are disposed within the intake air passage 1 in such a way that two junctions thereof are located at the higher and lower temperature sections respectively, a thermoelectromotive force according to the temperature difference $\Delta T$ is generated and a voltage ($V_2 - V_1$) indicative thereof can be obtained as shown in FIG. 1. In conventional measurement devices, the voltage ($V_2 - V_1$) is amplified by means of an amplifying circuit 4 to output a voltage signal E. The output voltage signal E is processed by means of a calculating circuit 5 wherein the output voltage signal E is converted into a measurement result, i.e., the desired temperature difference $\Delta T$.

Figure 2:
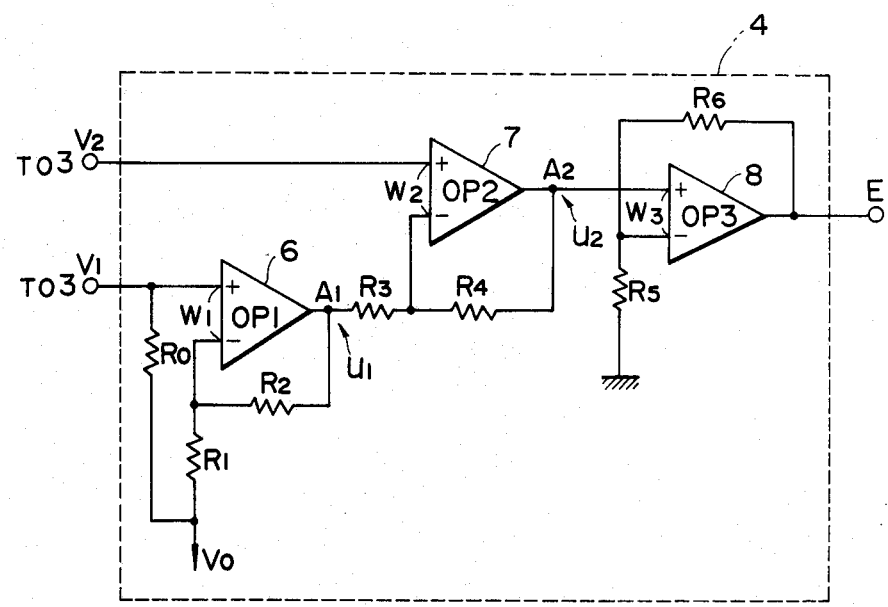
FIG. 2 is a circuit wiring diagram of an amplifying circuit shown in FIG. 1.

FIG. 2 shows the internal construction of the amplifying circuit 4.

In FIG. 2, the thermocouple comprising two different kinds of metals 2 and 3 is connected to the amplifying circuit 4. A thermoelectromotive force is generated between two junctions if there is a temperature difference $\Delta T$ between two bimetallic junctions, i.e., the Seebeck effect. The lower-temperature thermoelectromotive force $V_1$ is supplied to the amplifying circuit 4 at the noninverting input terminal of a first operational amplifier $OP_1$. The higher-temperature thermoelectromotive force $V_2$ is supplied to the amplifying circuit 4 at a noninverting input terminal of a second operational amplifier $OP_2$. Therefore, the resultant thermoelectromotive force ($V_2 - V_1$) is applied across the noninverting input terminal of the first operational amplifier $OP_1$ and the noninverting input terminal of the second operational amplifier $OP_2$. A constant voltage $V_0$ is also supplied to the inverting input terminal of the first operational amplifier $OP_1$ via a second resistor $R_1$ and the noninverting input terminal thereof via a first resistor $R_0$. A third resistor $R_2$ connects the inverting input terminal to the output terminal of the first operational amplifier $OP_1$. The first operational amplifier $OP_1$ acts as a differential amplifier. The inverting input terminal of the second amplifier $OP_2$ is connected to the output terminal of the first operational amplifier $OP_1$ via a fourth resistor $R_3$ and the output terminal thereof via a fifth resistor $R_4$. The second operational amplifier $OP_2$ also acts as a differential amplifier. The output terminal of the second operational amplifier $OP_2$ is connected to a noninverting input terminal of a third operational amplifier $OP_3$.

The inverting input terminal of the third operational amplifier $OP_3$ is grounded via sixth resistor $R_5$ and connected to the output terminal thereof via a seventh resistor $R_6$. The third operational amplifier $OP_3$ outputs a voltage E corresponding to the measured temperature difference by means of the thermocouple.

The third operational amplifier $OP_3$ acts as a noninverting amplifier. The first, second, and third operational amplifiers $OP_1$, $OP_2$, and $OP_3$ have their own offset voltages $w_1$, $w_2$, and $w_3$, respectively. In the construction of the amplifying circuit 4 described above, the output voltage $u_1$ of the first operational amplifier $OP_1$ can be expressed by the following first equation:

$$u_1 = -\frac{R2}{R1} V_0 + \frac{R1 + R2}{R1}(V_1 + w_1) \tag{1}$$

$$= -\frac{1}{\alpha} V_0 + \left(1 + \frac{1}{\alpha}\right)(V_1 + w_1)$$

$$= \frac{1}{\alpha}(V_1 - V_0 + w_1) + V_1 + w_1$$

, wherein $\alpha = R1/R2$.

An output voltage $u_2$ of the second operational amplifier $OP_2$ can be expressed by a second equation:

$$u_2 = \alpha(V_2 - u_1 + w_2) + V_2 + w_2 \tag{2}$$

, wherein $\alpha = R4/R3$. The output voltage E of the amplifying circuit 4 can be expressed by a third equation:

$$E = (1+\beta)(u_2 + w_3) \qquad (3)$$

, wherein $\beta = R6/R5$.

Consequently, the third equation (3) can be rearranged by substituting the first and second equations (1) and (2) thereinto to obtain the following fourth equation:

$$E = (1+\alpha)(1+\beta)(V_2 - V_1) + (1+\beta)\{(-1+\alpha)(w_2 - w_1) + w_3 + V_0\} \qquad (4)$$

In the fourth equation (4) described above, the first item on the right side of the equation corresponds to the measured difference in temperature and the second item corresponds to an offset voltage. The conventional measurement device uses the fourth equation (4). It should be noted that the first item of the right side of the fourth equation (4) also includes an inherent offset voltage which means that the difference between the higher- and lower-temperature thermo-electromotive forces $(V_2 - V_1)$ will probably not equal zero even when the ambient temperature of the thermocouple junctions is at 0° C., that is, when both $T_1$ and $T_2$ are 0° C., due to irregularity of a thermoelectromotive-force characteristics of the thermocouple junctions used therein.

Figure 3:
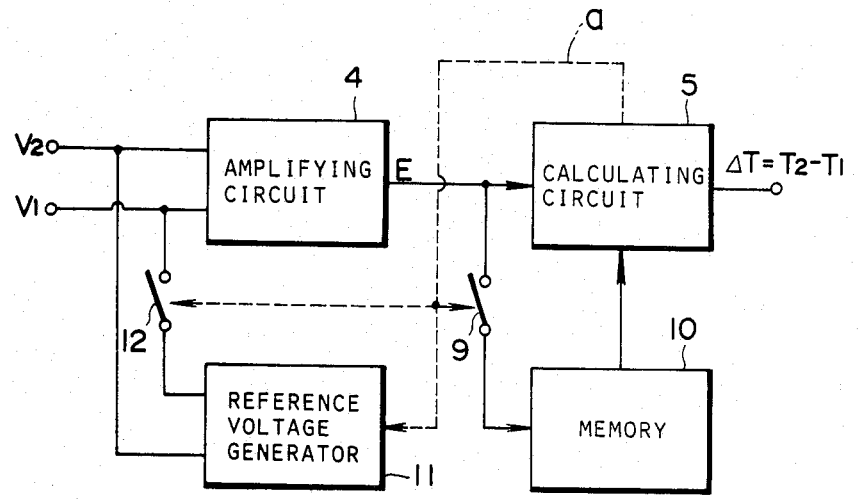
FIG. 3 is a simplified block diagram of a first preferred embodiment of a measurement device with automatic error compensation according to the present invention.

FIG. 3 shows a first preferred embodiment of a measurement device according to the present invention.

In FIG. 3, the amplifying and calculating circuits are the same as those shown in FIG. 1 and FIG. 2. A memory 10 is connected to the amplifying circuit 4 via a first switching means 9. The memory 10 is also connected to the calculating circuit 5. The first switching means 9 is opened or closed depending on a command signal from the calculating circuit 5. It should be noted that the first switching means 9 comprises a single independent switching element or a switching function included in the calculating circuit 5 or memory 10. It should also be noted that either a microcomputer or individual IC capable of performing arithmetic calculations may be used for the calculating circuit 5 and that the memory 10 needs to be nonvolatile.

In FIG. 3, if a temperature difference $\Delta T$ is measured as shown in FIG. 1, the first switching means 9 is closed and a first reference voltage, the zero-difference reference voltage (0 V) is applied across the input terminals of the amplifying circuit 4. When the first reference voltage is applied as described above, the value of output voltage $E_0$ of the amplifying circuit 4 is stored within the memory 10. Subsequently, when for example, a second reference voltage (4.1 mV) corresponding to the temperature difference at 100° C. is applied across the input terminals of the amplifying circuit 4, the value of an output voltage $E_{100}$ is similarly stored within the memory 10. These values of output voltages $E_0$ and $E_{100}$ are stored at different memory locations within the memory 10. If previous values of the output voltages $E_0$ and $E_{100}$ are stored, the previous values are corrected on the basis of the current values.

When the current temperature difference $\Delta T_c$ is measured, the switching means is opened so as to apply the voltage signal corresponding to the current temperature difference across the input terminals of the amplifying circuit 4. At this time, the voltage value $E_c$ outputted from the amplifying circuit 4 is sent into the calculating circuit 5. In the calculating circuit 5, the calculating operation listed below is performed using the stored values $E_0$ and $E_{100}$ from the memory 10:

$$\Delta T_c = \frac{E_c - E_0}{E_{100} - E_0} \times 100 \qquad (5)$$

Thus, the current output voltage $E_c$ of the amplifying circuit is converted into the desired temperature difference value $\Delta T$.

When such a measurement device as described above is used, the error of the measurement device due to the normal slight discrepancies between individual measurement devices, changes in the characteristic of the element thermocouple) during installation on the measurement device and deterioration of the characteristic of the element and the measurement device itself due to aging can automatically be cancelled by using the stored value within the memory 10 at the time of actual measurement, the stored value being derived from the output voltage of the amplifying circuit when the reference voltage is applied across the input terminals of the amplifying circuit.

This automatic compensation operation is performed at an interval of time predetermined by the calculating circuit 5 by updating the previously stored value.

It is preferable to store the values of output voltages $E_0$ and $E_{100}$ that are determined when the two different reference voltages are applied across the input terminals of the amplifying circuit, if the adjustment of the device's amplification factor and the device's offset voltage in the amplifying circuit 4 is difficult. If it is easy to adjust either characteristic of the measurement device due to the particular circuit construction of the amplifying circuit 4 or individual disparities and aging deterioration in a characteristic are not too great, one reference voltage can be applied to the amplifying circuit so as to update respective the stored voltage value $E_0$ or $E_{100}$ with the other output voltage value remaining stored as a constant value.

Figure 4:
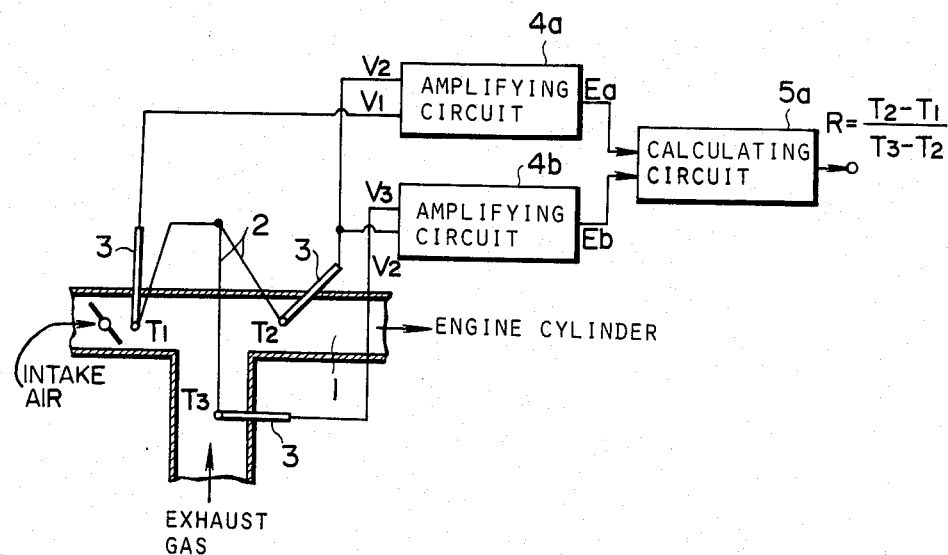
FIG. 4 is a simplified block diagram of another conventional measurement device applied to a temperature difference measurement.

FIG. 4 shows another conventional measurement device. This type of measurement device is applicable for measuring two temperature differences $\Delta T_{21} = T_2 - T_1$ and $\Delta T_{32} = T_3 - T_2$ as seen in FIG. 4 in the case where exhaust gas is recirculated into the intake manifold 1, wherein $T_1$ denotes the temperature of intake air introduced from outside the engine, $T_3$ denotes the temperature of engine exhaust, and $T_2$ denotes the temperature of intake air intermixed with exhaust. Consequently, the ratio of two temperature differences R can be expressed by the following equation:

$$\{R = \Delta T_{21}/\Delta T_{32} = (T_2 - T_1)/(T_3 - T_2)\}$$

The junctions of two different kinds of metals 2 and 3 are disposed at a lower temperature section, intermediate temperature section, and higher temperature section, respectively.

A thermoelectromotive force is generated according to the temperature difference $\Delta T_{21}$ and $\Delta T_{32}$ and two voltages $(V_2 - V_1)$ and $(V_3 - V_2)$ representing these forces are inputted to the input terminals of parallel amplifying circuits 4a and 4b. The internal circuit construction of the two amplifying circuits is the same as that shown in FIG. 2. The output voltage values Ea and Eb of the two amplifying circuits 4a and 4b can be obtained in the same way as expressed in the fourth equation (4). The value of the ratio R includes error due to random differences between the characteristics of the two each amplifying circuits and aging deterioration of the characteristic of the element and measurement device itself in the same way as in the conventional measurement device shown in FIG. 1.

Figure 5:
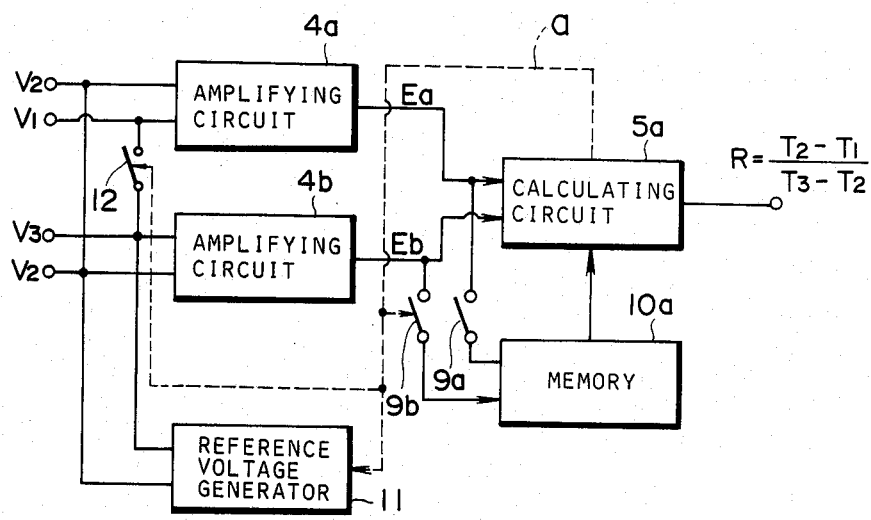
FIG. 5 is a simplified block diagram of a second preferred embodiment of a measurement device with automatic error compensation according to the present invention.

FIG. 5 shows a second preferred embodiment of a measurement device according to the present invention.

As shown in FIG. 5, the memory 10a is connected to the two amplifying circuits 4a and 4b via two separate but similar switching means 9a and 9b and is also connected to the calculating circuit 5a. The reference voltage generator 11 is connected to the input terminals of the two amplifying circuits 4a and 4b via a second switching means 12. These switching means 9a, 9b, and 12 are closed according to a command signal a from the calculating circuit 5a. The command signal a is also inputted into the reference voltage generator 11 to control the output of the reference voltage.

In the measurement device shown in FIG. 5, the command signal a is outputted by the calculating circuit 5a at a predetermined time (e.g., when the engine is started). At this time, the reference voltage is applied to the amplifying circuits 4a and 4b with the first switching means 9a and 9b closed simultaneously and two pairs of memory locations within the memory 10a are reserved for the respective output values Ea and Eb of the amplifying circuits 4a and 4b.

At first, when the first reference voltage 0 V corresponding to a temperature difference of zero is applied to the amplifying circuits 4a and 4b, the output values $Ea_0$ and $Eb_0$ of the respective amplifying circuits 4a and 4b are stored in the first pair of reserved locations of the memory 10a. Subsequently, a second reference voltage corresponding to a temperature difference of 200° C. is applied to the amplifying circuits 4a and 4b. The output voltages $Ea_{200}$ and $Eb_{200}$ of the amplifying circuits 4a and 4b are stored in the other pair of reserved memory locations of the memory 10a. If previous output voltage values $Ea_{200}$ and $Eb_{200}$, $Ea_0$, and $Eb_0$ are stored in the respective locations stored values of the output voltages are updated.

It should be noted that the first and second switching means 9a, 9b, and 12 are ordinarily open when measurements of the ratio R are made.

The voltage signal $(V_2 - V_1)_c$ representing the temperature difference $T_2 - T_1 = \Delta T_{21c}$ is applied to the associated amplifying circuit 4a and voltage signal $(V_3 - V_2)_c$ representing the temperature difference $T_3 - T_2 = \Delta T_{32c}$ is applied to the associated amplifying circuit 4b. From the output values $Ea_c$ and $Eb_c$, the calculating circuit 5a performs a series of arithmetic operations expressed in the equations given below by using the stored values $Ea_0$, $Eb_0$, $Ea_{200}$, and $Eb_{200}$:

$$\Delta T_{21c} = \frac{Ea_c - Ea_0}{Ea_{200} - Ea_0} \times 200 \quad (6)$$

$$\Delta T_{32c} = \frac{Eb_c - Eb_0}{Eb_{200} - Eb_0} \times 200 \quad (7)$$

$$R = \frac{\Delta T_{21c}}{\Delta T_{32c}} \quad (8)$$

Consequently, the output voltage values $Ea_c$ and $Eb_c$ are converted to the respective tempeature differences $\Delta T_{21c}$ and $\Delta T_{32c}$ to obtain the desired ratio of R.

Figure 6:
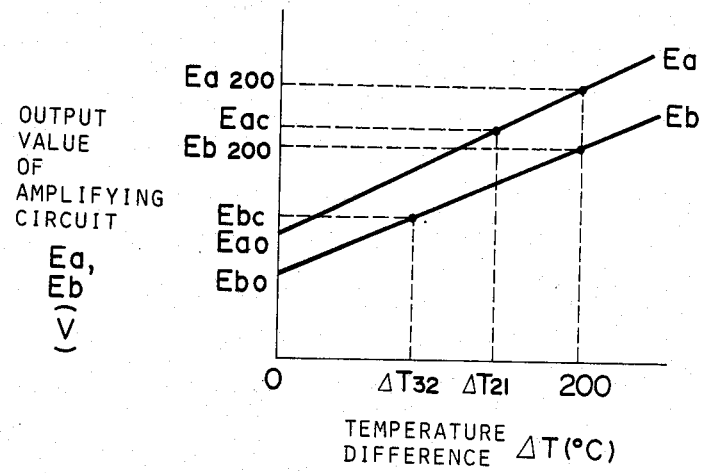
FIG. 6 is a graph for clarification of a calculating processing of a calculating circuit shown in FIG. 5.
Figure 7A:
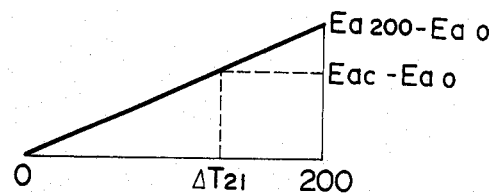
FIGS. 7(A) and 7(B) are detailed views of portions of the graph of FIG. 6.
Figure 7B:
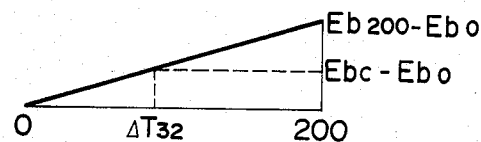

The equation (6) expressed above is shown in FIG. 6 and FIG. 7(A) and equation (7) is shown in FIG. 6 and FIG. 7(B).

In the second preferred embodiment described hereinabove, the errors in the measurement device due to the differences between indivdiual measurement devices, accidental damage to the elements during installation, and aging deterioration of the measuring characteristics are compensated with the degree of compensation being adjusted for at predetermined intervals of time.

In these preferred embodiments, the measurement of temperature difference was described merely as an example of the variable to be measured, as explained previously.

Since the measurement device according to the present invention can measure variables by converting the detected voltage into a desired variable by means of the calculating circuit, the measurement device can apply equally well to the measurement of various measurable variables such as displacement, pressure, fluid flow rate, etc.

As described before, since the measurement device according to the present invention stores an output voltage value of the amplifying circuit in response to a reference voltage applied automatically to the amplifying circuit at a time predetermined by the calculating circuit and calculates the desired variable by performing a calculation operation using the stored value, the labor required for the adjustment of circuit parameters in the measurement device can be avoided and normal individual variations in the characteristics of the measurement devices at the time of manufacture can automatically be compensated for. Therefore, there arises no special problem due to indivdiual variations or deterioration of the characteristics of the measurement device. Consequently, the measurement device can perform accurate measurements with improved reliability and service life.

It will be fully understood by those skilled in the art that the foregoing description is made in terms of the preferred embodiments and modifications may be made without departing the scope and spirit of the present invention which is to be defined by the appended claims.

What is claimed is:

1. A physical quality measuring device comprising:
   (a) a first means for detecting the temperature difference between two different positions in an engine intake air passage and generating voltage signal according to the temperature difference, said first means detecting the temperature difference by using a thermocouple having one junction thereof located in the upstream portion of the intake air passage for detecting the temperature of intake air from outside of the engine and the other junction thereof located in the downstream portion of the intake air passage for detecting the temperature of a mixture of air from the outside of the engine and engine exhaust recirculated from the engine, the thermocouple generating a voltage signal corresponding to the difference in temperature between the intake air from outside of the engine and the mixture of air from outside of the engine and engine exhaust recirculated from the engine;
   (b) second means for receiving and amplifying the voltage signal from said first means to produce an amplified voltage signal corresponding to said voltage signal;

(c) third means for generating a first reference voltage corresponding to a temperature difference of zero between the two junctions and a second reference voltage the value of which corresponds to a predetermined value of the temperature difference in response to a command signal and applying said first and second reference voltages to said second means, respectively in response to said command signal, whereby first and second output values are produced by said second means from said first and second reference voltages, respectively;

(d) fourth means for storing said first and second output values produced by said second means when said third means applies the said first and second reference voltages to said second means in response to said command signal, respectively; and (e) fifth means for generating said command signal and calculating the measured value of the temperature difference on the basis of the amplified voltage signal of said second means derived from the voltage signal of said first means and on the basis of the first and second output values stored in said fourth means, while said first and second output values are stored by said fourth means.

2. A measurement device as set forth in claim 1, wherein said first means detects the temperature differences between three different positions of an engine intake air passage by using a thermocouple having a first junction thereof located in the upstream portion of the intake air passage for detecting the temperature of intake air from outside of the engine, a second junction thereof located in the downstream portion of the intake air passage for detecting the temperature of intake air mixed with exhaust gas, and a third junction thereof located in an exhaust gas passage leading to the intake passage for detecting the temperature of exhaust gas entering the intake air passage; and wherein said second means comprises two linear amplifying circuits, a first linear amplifying circuit connected to said first and second junctions of the thermocouple, and a second linear amplifying circuit connected to said second and third junctions of the thermocouple; and wherein said third means is a reference voltage generator that outputs and applies a first reference voltage corresponding to a temperature difference of zero between the two junctions to said first and second linear amplifying circuits, so that said fourth means stores the output voltages of said first and second linear amplifying circuits when said first reference voltage is applied to said first and second linear amplifying circuits.

3. A measurement device as set forth in claim 2, wherein said third means is a reference voltage generator that sends and applies a second reference voltage corresponding to a temperature difference of 200° C. to said first and second linear amplifying circuits, so that said fourth means stores the output voltages of said first and second linear amplifying circuits when said second reference voltage is applied to said first and second linear amplifying circuits.

4. A measurement device as set forth in claim 3, wherein said fifth means calculates a desired temperature difference ratio in accordance with the equations:

$$\Delta T_{21c} = \frac{Ea_c - Ea_0}{Ea_{200} - Ea_0} \times 200,$$

$$\Delta T_{32c} = \frac{Eb_c - Eb_0}{Eb_{200} - Eb_0} \times 200 \text{ and}$$

$$R = \frac{\Delta T_{21c}}{\Delta T_{32c}},$$

wherein $\Delta T_{21c}$ denotes the temperature difference between the positions at said first and second junctions of the thermocouple, $\Delta T_{32}$ denotes the temperature difference between the positions at said second and third junctions of the thermocouple, $Ea_0$ and $Eb_0$ denote the output voltages of said first and second amplifying circuits when said first reference voltage is applied thereto, respectively, $Ea_{200}$ and $Eb_{200}$ denote the output voltages of said first and second linear amplifying circuits when said second reference voltage is applied thereto, respectively, $Ea_c$ and $Eb_c$ denote the current output voltages of said first and second linear amplifying circuits, and R denotes the ratio of the temperature differences $\Delta T_{21c}$ and $\Delta T_{32}$.

5. A measurement device as set forth in claim 1, wherein said third means is a reference voltage generator that sends and applies a second reference voltage corresponding to a temperature difference of 100° C. to said second means at a predetermined time.

6. A measurement device as set forth in claim 5, wherein said calculating means calculates the value of the measured temperature difference according to the equation $$T_c = \frac{E_c - E_0}{E_{100} - E_0} \times 100$$

wherein $E_0$ denotes the output voltage of said second means when said first reference voltage is applied to said second means, $E_{100}$ denotes the output voltage of said second means when said second reference voltage is applied thereto, and $E_c$ denotes a current output voltage of said second means when the thermoelectromotive force generated by said thermocouple is applied to said second means.

7. A measurement device as set forth in claim 1, wherein said fourth means is a non-volatile memory and the stored output voltage value of said second means is updated by said command signal from said fifth means whenever measurement of the physical property is performed.

8. A physical quanitity measuring device, comprising:
(a) a first means for detecting the temperature difference between two different positions in an engine intake air passage and generating a voltage signal according to the detected temperature difference, said first means detecting the temperature difference by using a thermocouple having one junction thereof located in the upstream portion of the intake air passage for detecting the temperature of intake air from outside of the engine and the other junction thereof located in the downstream portion of the intake air passage for detecting the temperature of a mixture of air from the outside of the engine and engine exhaust recirculated from the engine, the thermocouple generating a voltage signal corresponding to the difference in temperature between the intake air from outside of the engine and the mixture of air from outside of the engine and engine exhaust recirculated from the engine, (b) second means for receiving said linearly amplifying the voltage signal from said first means to produce an amplified voltage signal according to the level of the voltage signal;

(c) third means for calculating the measured temperature difference on the basis of the amplified voltage signal from said second means;

(d) fourth means for generating at least one reference voltage signal whose level corresponds to a a temperature difference of zero between the junctions and for applying the reference voltage signal to said second means in response to a predetermined command signal in place of application of the voltage signal of said first means; and (e) fifth means for storing the output amplified voltage signal of said second means when the reference voltage signal is applied to said second means in response to the predetermined command signal, said third means generating the predetermined command signal and calculating the measured temperature difference on a basis of the current output amplified voltage signal of said second means with reference to the amplified voltage signal stored in said fifth means while said amplified voltage signal is stored in said fifth means and with reference to a zero value of the temperature difference corresponding to the reference voltage signal of said fourth means.

9. A physical quantity measuring device comprising:

(a) first means for detecting the physical quantity and generating a voltage signal according to the detected physical quantity;

(b) second means for receiving and amplifying the voltage signal from said first means to produce an amplified voltage signal corresponding to said voltage signal;

(c) third means for generating first and second reference voltages the values of which correspond to predetermined values of the physical quantity in response to a command signal and applying said first and second reference voltages to said second means, respectively in response to said command signal, whereby first and second output values are produced by said second means from said first and second reference voltages, respectively;

(d) fourth means for storing said first and second output values produced by said second means when said third means applies the said first and second references voltages to said second means in response to said command signal, respectively; and (e) fifth means for generating said command signal and calculating the measured value of the physical quantity on the basis of the amplified voltage signal of said second means derived from the voltage signal of said first means and on the basis of the first and second output values stored in said fourth means and while said first and second output values are stored by said fourth means, said fifth means calculating the measured value of the physical quantity from a first difference between the current amplified voltage signal of said second means and the first output value stored in said fourth means and a second difference between the second and first output values stored in said fourth means by multiplying a ratio of the first difference to the second difference by the predetermined value of the physical quantity corresponding to the second reference voltage of said third means.

* * * * *